(12) United States Patent
Gottschalk et al.

(10) Patent No.: US 7,203,509 B2
(45) Date of Patent: Apr. 10, 2007

(54) METHOD FOR MANAGING COMMUNICATION SESSIONS

(75) Inventors: Thomas Gottschalk, Berlin (DE); Eric Hilf, Berlin (DE); Olaf Kautz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/553,448

(22) PCT Filed: Dec. 22, 2004

(86) PCT No.: PCT/EP2004/053648

§ 371 (c)(1),
(2), (4) Date: Oct. 14, 2005

(87) PCT Pub. No.: WO2005/076650

PCT Pub. Date: Aug. 18, 2005

(65) Prior Publication Data

US 2006/0276213 A1 Dec. 7, 2006

(30) Foreign Application Priority Data

Feb. 5, 2004 (DE) .................... 10 2004 005 720
Feb. 20, 2004 (DE) .................... 10 2004 008 392

(51) Int. Cl.
*H04B 7/00* (2006.01)
*H04Q 7/20* (2006.01)

(52) U.S. Cl. ............... 455/518; 455/514; 455/3.05; 455/90.2; 455/415; 455/416; 455/432.3; 370/296

(58) Field of Classification Search ............ 455/518, 455/519, 514, 3.05, 415, 416, 432.3, 90.2, 455/90.3; 370/296, 277, 276, 432, 313
See application file for complete search history.

(56) References Cited

U.S. PATENT DOCUMENTS

| | | | |
|---|---|---|---|
| 6,434,402 B1 | 8/2002 | Davison et al. | |
| 6,608,820 B1 | 8/2003 | Bradshaw et al. | |
| 6,650,908 B1 | 11/2003 | Coombes et al. | |
| 6,792,281 B2 * | 9/2004 | Upp et al. ................ | 455/519 |
| 2003/0050078 A1 * | 3/2003 | Motegi et al. .............. | 455/456 |

FOREIGN PATENT DOCUMENTS

| | | |
|---|---|---|
| WO | WO 03/017522 | 2/2003 |
| WO | WO03017522 | 2/2003 |

* cited by examiner

*Primary Examiner*—Matthew D. Anderson
*Assistant Examiner*—Shaima Q. Aminzay
(74) *Attorney, Agent, or Firm*—Bell, Boyd & Lloyd LLP

(57) ABSTRACT

A method for managing communication sessions in a packet-oriented communication system, consisting of a central control unit and a plurality of mobile stations, which can be interconnected via the central control unit. To achieve this, a communication session is established between mobile stations that are assigned to a first communication group. Session priorities are then defined for a first mobile station of the first communication group, said station being in addition assigned to at least a second communications group. Finally the session priorities are transmitted to the central control unit. A second communication session is also established between those mobile stations that are assigned to the second communication group(s), including the first mobile station. Both the first and the second communication session are established via the central control unit, in such a way that the latter can manage the first mobile station in both communication sessions according to the transmitted session priorities.

17 Claims, 9 Drawing Sheets

METHOD FOR MANAGING COMMUNICATION SESSIONS

FIELD OF TECHNOLOGY

The present disclosure relates to a method for administration of communication sessions, especially communication sessions within the framework of what is referred to as a "push-to talk" service in which a sender can send a voice message to a number of recipients simultaneously in accordance with the half-duplex method. This means that while the sender is transmitting voice messages the recipients cannot interrupt it.

BACKGROUND

With a service for transmitting voice data between mobile radio devices in a communication network, known as the "push-to-talk"-service (PTT service), a user, after pressing a special key provided for the purpose on his mobile radio device, can transmit a voice message to a recipient (or even a number of recipients simultaneously) almost in real time. The (one or more) recipients have the opportunity to send an answer in the same way, so that this PTT service is comparable with the known "walkie-talkie" service. The disadvantage of a conventional PTT service is that a user with his mobile radio device can only ever be involved in one communication session of a communication group. If he wants to be involved in a further session he must end the session which is currently active and establish a connection to another desired communication session of another communication group. This means that it is not possible to participate in a number of PTT sessions simultaneously. Managers in particular would find simultaneous or parallel presence in a number of sessions or a number of communication groups helpful.

BRIEF SUMMARY

Accordingly a system and method is disclosed for parallel participation in a number of communication sessions.

A method for administration of communication sessions in a packet-oriented communication system, is further disclosed of including a central control device and a plurality of mobile stations, which can be connected to each other via the central control device or can establish a communication connection via the central control device. A communication session is first set up between mobile stations which belong to a first communication group via the central control device. Subsequently a first mobile station of the first communication group, which belongs to at least a second communication group, defines a session prioritization. The session prioritization specifies the communication session with an associated communication group in which the first mobile station would like to be an active participant, and the communication session of the remainder of the associated communication groups in which the first mobile station would like to be a passive participant. This means that the requirement here is for the first mobile station to belong to a number of communication groups or be entered as a participating mobile station. This session prioritizing is then transmitted to the central control device, which administers the individual communication sessions and thereby the entire data communication is directed from a mobile station via the central control device to the other mobile stations of a communication group. A second communication session between mobile stations including the first mobile station which belong to the at least one second communication group is established via the central control device. In this case the establishment of the second communication session can be initiated by the first mobile station or by any of the other mobile stations of the second communication group. Finally the first mobile station or the data communication system with the first mobile station is administered by the central control device in the two communication sessions in accordance with the session prioritization transferred from the first mobile station. This means, according to the definition of the communication session in which the first mobile station wishes to actively participate, that it is given specific rights for data transmission, or a particular type of data or a specific format of data is defined for receipt by the first mobile station, whereas for the first mobile station in a passive participation state other rights for data transmission or other data formats for receipt of data or data packets are defined. Accordingly, a mobile station can now participate in at least two communication sessions taking place in parallel, in which case for example the user of the above-mentioned first mobile station can define (through the session prioritization) the communication session in which he wishes to actively participate and the communication session in which he wishes to passively participate.

Under an exemplary embodiment, the active participation state of the mobile station in a communication session data packets is transmitted with (acoustic) speech information to or from the first mobile station. In the active participation state the first mobile station has the right both to send data to the other participants or mobile stations, as well as the right to receive data or data packets. A further indication of the active participation state can be that data packets with speech information can be transmitted from or to the first mobile station. If the first mobile station receives data or data packets with speech information, these can be output directly by an acoustic output device such as a loudspeaker, of the first mobile station for the user. Where the first mobile station has the right to send data to other participants of the communication session or communication group, speech information can also be captured by an acoustic input device of the first mobile station, such as a microphone, and after corresponding processing in the first mobile station transmitted as data packets to the central control device, which forwards the data packets to the other participants in the communication session.

Under another exemplary embodiment, data packets with text information are transmitted to the first mobile station instead of packets with speech information during a passive participation state of the first mobile station in a communication session. The passive participation state can be characterized such that the first mobile station is no longer given the right to transmit data to the other participants of the "passive" communication session. This means that the first mobile station "only listens in to the communication session". The text information in the received data packets is then advantageously output on a display device or on a display of the first mobile station for its user. It is thus possible for the first mobile station to simultaneously participate in at least two communication sessions, with the "passive" text information received in the first communication session being output on the display device while simultaneously speech information received in the "active" communication session is output acoustically through a loudspeaker of the mobile station. Accordingly, if the first mobile station has the right to send data, speech information can be simultaneously captured by a microphone and this speech information can, after the corresponding processing, be forwarded to the participants in the active communication session, while text information of the passive communication session or communication group is received and presented on the display device.

As already mentioned above, data packets with speech information can be exchanged in communication sessions. This means that if a user or participant is speaking, their speech will be captured by their mobile station, and after corresponding processing or digitization, directed in the form of data packets with speech information to the other session participants via the central control device. The sending or receiving of data packets with speech information can then be designated as the active participation state in a communication session. As has further already been explained above, the first mobile station (or also other mobile stations) can also participate passively in a communication session, in which case data or data packets with text information is merely transmitted to the passive mobile station.

Under another embodiment, the data packets with speech information normally exchanged in an active communication session are converted for the passive participants into data packets with text information and finally submitted to the passive participants. Reference should again be made to the example of the first mobile radio station which thus is assigned from the active communication session or communication group through the central control device data packets with speech information whereas it has data packets with text information delivered to it from the passive communication session or communication group. Advantageously the data packets delivered in each case to the mobile stations participating in a number of communication sessions are for example identified in a header field of the data packets, namely to indicate whether they originate from an "active" or "passive" communication session or communication group. Accordingly the identification of the data packets by the relevant "multi-active" or multiple participating mobile station, such as the first mobile station as here in the example, can be analyzed and after the appropriate processing the speech information or text information can be output either through a loudspeaker or a display device.

The communication sessions can in this case advantageously be realized as push-to-talk sessions (PTT sessions) in which one mobile station as transmitter sends a voice message to a number of receiving mobile stations simultaneously in accordance with the half-duplex method via the central control device. This means that only one sender or the sender has the right at a specific time to send messages or voice messages to the other session participants, with the other session participants being unable to interrupt them while they are doing so. Only after the sender has finished sending messages or voice messages can the central control device assign another session participant the right to appear as a sender themselves and send voice messages in accordance with the half-duplex method to the other session participants.

The transmission of speech data or voice messages in a communication session can further be designed such that a sender sends voice messages or data packets with speech information to the central control device, in which case the latter informs the other participants in the communication session that data packets are ready for transmission from a sender. If one of the remaining communication session participants or a mobile station of the communication session wishes to receive the data packets which are ready, it can inform the control device about this, in which case the latter transmits these data packets to this consenting mobile station.

So that the other participants of the communication sessions can estimate in each case whether a reaction is to be expected at all from the first mobile station or its user, or how quickly the reaction is to be expected, it is advantageous for these other participants or mobile stations to be informed about the relevant participation state of the first mobile station in the communication sessions. If the first mobile station for example has defined its session prioritization such that it would like to actively participate in the first communication session, the remaining participants or mobile stations of the first communication session are advantageously notified that the mobile station is actively participating here so that they can count on a reaction to specific requests or states of affairs in the communication session. Furthermore the other participants of the at least one second communication session or communication group can be informed that the first mobile station is only a passive participant here. These participants of the at least one second communication session can then prepare themselves for the fact that no direct reaction of the first mobile station or of its user is to be expected.

To further improve the information provided to the participants in the relevant communication sessions or to improve the user-friendliness, it is advantageous to inform the relevant participants of the relevant communication sessions about the communication sessions in which the first mobile station (but also other possible multiple-participation mobile stations) is currently participating. This means that the central control unit which is administering the relevant communication sessions can further send a notification to each mobile station of a communication session or communication group with status information of the first mobile station or also for all the other remaining session participants of the same communication session in which information is provided about the further communication sessions in which the relevant other communication users are involved (advantageously with the additional information as to whether it is active or passive involvement).

Under yet another embodiment, a method is disclosed for executing or administering a number of parallel communication sessions. Communication sessions are administered in a packet-oriented communication system comprising a central control device and a plurality of mobile stations that can be connected to each other via the central control device. A first communication session is established between mobile stations which are assigned to a first communication group via the central control device. Further, a second communication session is established via the central control device between mobile stations, including a first mobile station, which are assigned to the at least one second communication group. The user of the first mobile station defines a session prioritization for his first mobile station and transmitting this to the central control device. As a consequence the first mobile station is administered by the central control device in the two communication sessions in accordance with the session prioritization transmitted. Advantageously the session prioritization specifies the communication session with one of the assigned communication groups in which the first mobile station would like to participate in an active participation state and the communication session of the others of the assigned communication groups in which the first mobile station would like to participate in a passive participation state. This can mean that in the active participation state of a communication session data packets with speech information are transmitted to or from a the first mobile station which are acoustically output and/or captured from the relevant mobile station, whereas in the passive participation state data packets with the text information are transmitted to the first mobile station which are output on a display of the first mobile station.

If the user of the first mobile station has defined his session prioritization such that he is participating in the first communication session in an active participation state and in the second communication session in a passive participation state, a problem can however occur in that the mobile stations of the second communication group or communication session are not informed about the activities of the first mobile station or its user in the first communication group or communication session, that is they do not know whether the user of the first mobile station is currently speaking in his communication session or is just listening. As a consequence the mobile stations of participants of the second communication session are not in a position to correctly assess any reactions or lack or reactions from the user of the first mobile station, and thus avoid faults or futile signaling or requests to the user of the first mobile station who may just be in the process of speaking.

To process and to know in advance the activity status of a participant or a mobile station (multiple-participation mobile station) which is participating in a number of communication sessions in parallel, the mobile stations of the communication sessions in which a multiple-participation mobile station is passively participating should be notified of the current activity status of this multiple-participation mobile station in its active communication session. In other words, the mobile stations in the passive communication sessions should find out whether the multiple-participation mobile station participating passively in their communication session currently has the right to speak and is sending voice messages or data packets with voice information to the remaining mobile stations of the active communication session (active or busy) or is only listening in and as a consequence is receiving voice messages (passive).

Thus a planned reaction or planning of the communication session execution sequence is to a certain degree possible for all participants or mobile stations involved in different communication sessions. If an SIP (Session Initiation Protocol) or RTP (Real Time Protocol) is used for establishing or executing the communication session the transmission of the activity status produces the direct advantage of savings in SIP or also RTP signaling, since an access to or a required reaction from a (multiple-participation) participant who is currently speaking in a communication session by participants in another session can be avoided at the actual "busy/seized" moment (signaling lies in kbyte range). This also means explicit savings in "air traffic" in wireless systems. Further advantages are produced such that nothing is lost to the (multiple-participation) participant in the discussions in the different communication sessions.

At the same time, the participants of the different communication sessions are signaled that the participant (or the participants who are involved in a number of parallel sessions) is actively participating in one of the different communication sessions in parallel in such a way that he is currently "active" or busy and is speaking. Through this signaling of the activity of a (multiple-participation) participant the other participants can adjust to possible delays of the (multiple-participation) participant in the reactions or only include the participant in the round of discussions if the signaling (of the active status) makes it evident that this participant is not currently an active speaker in another communication session which is "active" for him.

Thus new or expanded signaling is proposed which represents the activity status of the active participation in a primary ("active") communication session but also the passive participation in a secondary ("passive") communication session in greater detail and advantageously presents it in a visual way. This new signaling of the activity status can assume a value "PB" for the "busy" state by which the participants of a secondary communication session are informed that the (multiple-participation) participant is briefly busy since he has assumed an active part in his primary communication session.

In another embodiment, a communication system comprising a central control device and a plurality of mobile stations is created that is designed to execute the method presented above. In this case the communication system can operate especially in accordance with the UMTS (Universal Mobile Telecommunication System) standard or the GPRS (General Packet Radio Service) standard. The mobile stations can in this case be especially embodied as mobile telephones or mobile radio devices which communicate via an air interface with a base station system of the communication system. The central control device can in this case be arranged in the core network of the communication system.

Additional features and advantages of the present invention are described in, and will be apparent from, the following Detailed Description and the Figures.

BRIEF DESCRIPTIONS OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
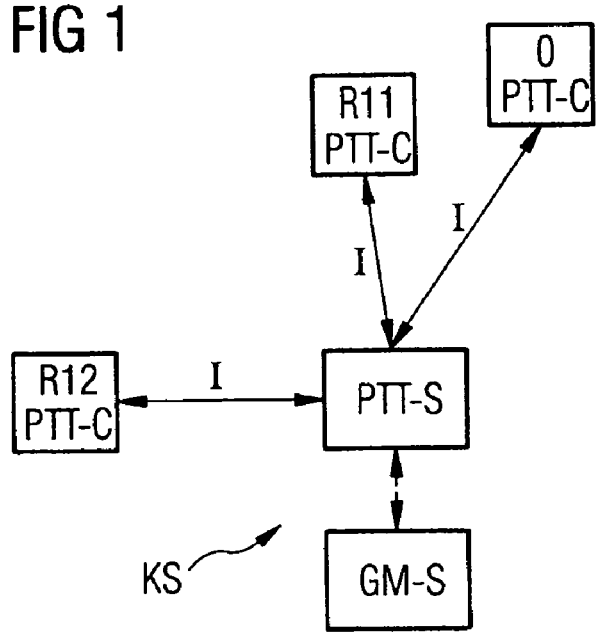
FIG. 1 is a schematic diagram of a general architecture of a communication system for implementing a "push-to-talk" service.

In the mobile radio standard UMTS there is provision for many packet-oriented services. The difference between packet-oriented and circuit-oriented services primarily lies in the fact that, with packet-oriented services, there is no permanent connection between a sender (a first mobile radio device or mobile telephone) and a recipient (of a second mobile radio device or mobile telephone) as is usual in voice telephony, but that the sender sends individual data packets that are provided with the address of the recipient of the packet in each case. This means that there is a logical connection between the sender and the recipient(s), but no direct physical connection Most data and multimedia services are packet-oriented. Speech on the other hand is mostly transmitted in circuit-switched mode because of its duplex capabilities and the stringent real time conditions. However there are also speech services in which packet-oriented transmission takes place, for example the "Voice-over-IP" service. In this case the speech is digitized, compressed and sent in packets to the recipient. There the data packets are decompressed again and finally converted from digital to analog and output as speech. Packets are transmitted in accordance with the Internet Protocol (IP). This is stateless and mostly operates in accordance with the "Best-Afford" method. This means that parameters are used which provide a maximum connection quality. However no quality of service (QoS) can be ensured. Thus, depending on the load on the network, unreasonably long delay times or bandwidths which are too narrow can hinder a service. With voice services, this behavior manifests itself as delay time which makes direct communication very difficult or even prevents it altogether. It can also occur that individual sections of the speech have to be discarded altogether. For this reason a speech application or a speech service which does not impose such high demands on the bandwidth and the maximum delay time is preferably to be implemented here. In particular here a point-to-multipoint speech service (point-to-point speech service is a special case of the point-to-multipoint speech service) which dispenses with duplex capability is advantageous. This means that a service is advantageous in which only one participant can speak at a specific time.

The speech of this participant is then digitized and the data packets are sent to the relevant recipients. These hear the voice message of the sender after a short delay time. Such an application is called a "near real time" application. In accordance with the method used for requesting the right to send, this type of application can also be referred to as a "push-to-talk" application or as a "push-to-talk" service. Since only one person or one participant can speak at a specific time, this must be signaled accordingly. This can be done by a person who wishes to talk pressing a button or a key on their mobile telephone. A central control device in the mobile radio system then gives this person right to be able to transmit a voice message provided no other participant is transmitting at the time. Since normally the data packets with voice messages are buffered, those participating in this "push-to-talk" service can also have the voice message repeated. This type of communication demands a certain discipline, as is known from CB(Citizen's Band) radio. An effective type of communication is the sending of status messages. Thus it is useful to signal for example whether a participant has understood the voice message received acoustically and/or as regards content and whether the participant agrees with the content or not. A short interruption of a participant in communication should also be signaled.

In short, this type of push-to-talk or PTT service just described enables a sender to send a voice message simultaneously to one or more recipients using the half-duplex-method (the sender can only speak or send voice messages, in which case the recipients may not interrupt him). In this case it is advantageous to distribute the data packets with the voice messages or speech information over the network while the sender is still speaking (i.e. to begin "streaming" while the sender is still speaking). The PTT service is similar to CB radio from the user's point of view, however with the exception that the sender can even speak to recipients who are far away and who can be reached via a mobile radio network. A classical application in which a PTT service such as the one just described above can be used, will be presented below. A boss wants to quickly send his five employees a voice message. To do this he activates the PTT service via the menu of his mobile telephone or mobile radio device and selects as addressees or recipients his five employees (for example from his telephone book). After establishing the PTT service between his mobile telephone and the mobile telephones (or other PTT-enabled mobile terminals) of his employees, the boss presses the special button provided on his mobile phone for the purpose and speaks his voice message which is recorded by a microphone of the mobile telephone, is processed by the processing unit of the mobile telephone and forwarded via a communication network such as an above-mentioned mobile network, to the employees. The service can in this case be defined so that the bosses voice message is output directly from the loudspeaker of the relevant mobile telephone of the recipient. However it is also conceivable for the recipient or employee to initially receive just a notification that a message is waiting for them from the boss, in which case the employees must first confirm this message before the voice message is transmitted to their mobile telephone and output through a loudspeaker. An underlying network architecture of a communication system for implementing of the PTT service just described is shown in FIG. 1 and will be explained in more detail below.

As well as establishing an individual communication session between mobile telephones of a communication group, for specific people, such as project managers or other management staff, simultaneous participation in a number (at least two different) PTT sessions can be of interest, in which case different interest groups can be served at the same time. In accordance with an exemplary embodiment shown below it is thus guaranteed that a participant can participate in at least two parallel PTT sessions, without having to constantly switch back and forth between the sessions, which in the prior art would mean constantly setting up and clearing down the sessions. In accordance with the embodiment, it is made possible for a participant to prioritize the parallel sessions and to set the outputs accordingly on the display (whether as speech output via a loudspeaker or as text output via a display). This ensures that different sessions can be followed on different input and output devices. If the communication sessions are taking place within the framework of the "Session Initiation Protocol" (SIP), in accordance with the embodiment of the invention a saving in SIP signaling can be achieved, since the constant setting up and clearing down of active data connections is avoided (signaling here is within the kbyte range). This naturally then also explicitly means a saving in the air traffic in wireless systems.

In accordance with specific versions of the embodiment further advantages are produced such that nothing "is lost" to a participant who wishes to participate in a number of different sessions. Simultaneously it can be signaled to the participants of the different sessions that the "multiple" participant or further "multiple" participants (those who are participating in a number of sessions) is participating in parallel in different sessions and has undertaken a personal session prioritization (depending on the significance of other conditions) between the parallel sessions. Through this signaling of the session prioritization the other participants in the relevant communication sessions or communication groups can adjust to possible small delays of a multiple participant in the response times.

Reference is now made to FIG. 1 in which the general or underlying architecture of a communication system KS for implementing a PTT service is shown. The communication system KS in this case features a central control device in the form of a PTT server PTT-S which is connected via the relevant interfaces I to what are known as PTT clients or PTT participants 0, R1, R2. These PTT-participants O, R1 and R2 can represent a communication group between which a communication session can be established via the PTT server PTT-S. The communication system can be in this case for example be embodied in the form of a mobile radio system, with the relevant PTT participants being formed by mobile telephones or mobile radio devices (or other PTT-enabled devices with a radio module and corresponding software, known as PTT client software) which is connected via an air interface I with a base station system of the mobile radio system, which in a core network) contains the PTT server PTT-S. This means that the communication system KS can operate in accordance with the UMTS standard in which the interface I establishes a connection from the mobile telephones or mobile radio devices O, R1, R2 to the so-called "Radio Access Network" RAN and via this finally to the core network and the IP-multimedia subsystem.

The PTT server PTT-S maintains lists of communication groups, i.e. lists of participants who can be connected to each other within a communication session. These lists contain the addresses of the participants or clients (in the Figures the clients are identified by the abbreviation PTT-C). Furthermore the PTT server PTT-S regulates the logging on and logging off of participants to the communication sessions, establishes the sessions, directs the data or data packets in the packet-oriented communication system to the relevant participants and bills for the services. Furthermore the PTT server PTT-S also issues the right or enables a participant to send to the other participants concerned. Since in accordance with the embodiment of the invention described below it is also possible for a participant or a mobile telephone to participate in a number of communication sessions, the PTT server PTT-S also administers the allocation of data packets with speech information to participants who are taking part in more than one PTT session and distributes the assignment of whether it is active participation or passive participation to the relevant participants in the communication sessions as a supplementary status to the actual status of the "multiple" participant The relevant status information is stored on the PTT server for the duration of a session. The participants in the communication sessions log onto and log off from the PTT sessions, signal their desire to send and send status messages during a session or the sessions. The data or data packets which are transmitted from the PTT server are to the relevant participants are received by the latter, processed and finally output to the relevant users, as is explained in more detail below.

For the sake of completeness it should be mentioned that what is known as a Group Management Server GM-S can be used for organization of the communication groups of participants in a PTT session, said group Management Server being connected to the PTT server PTT-S. It is however also conceivable for the functionality of this Group Management Server to also lie within the PTT server itself.

Figure 2:
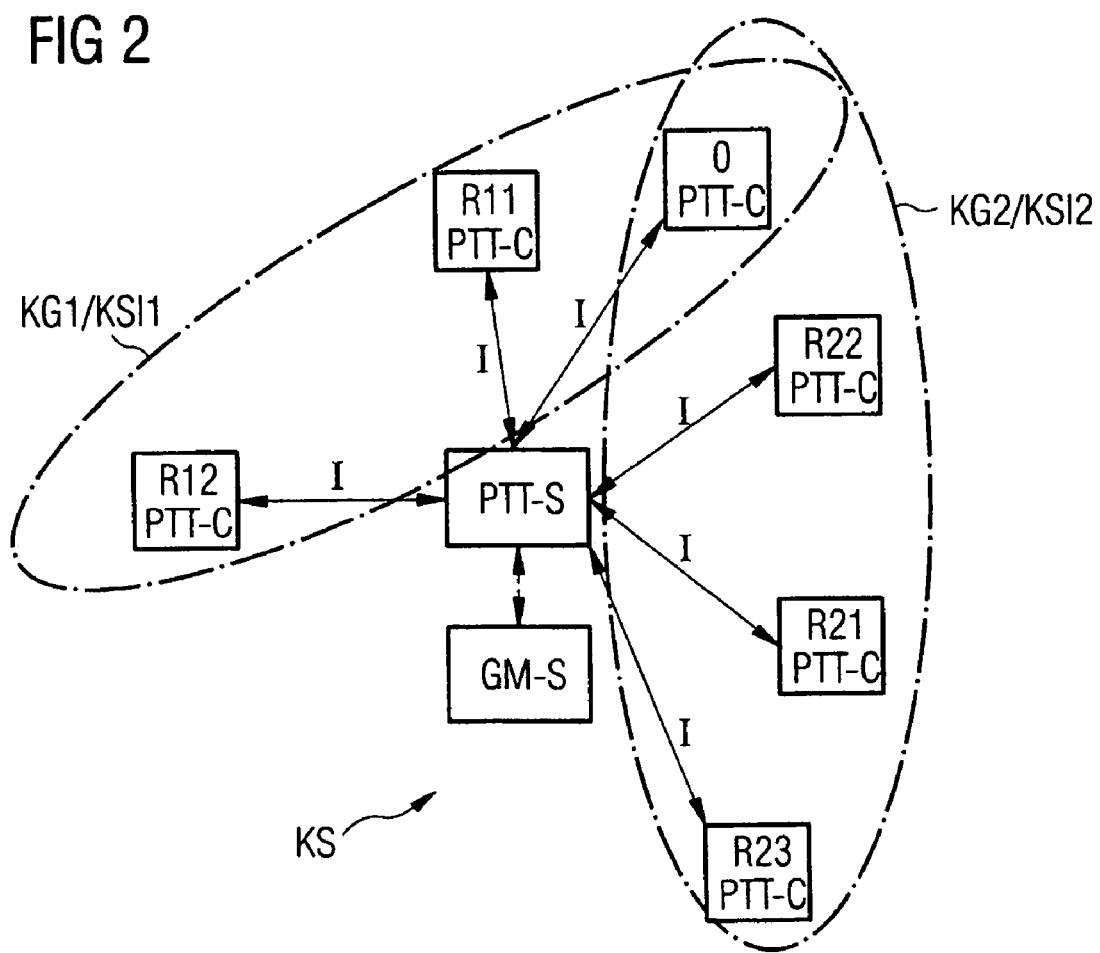
FIG. 2 is a schematic diagram of the network architecture of a communication system for implementing a PTT(push-to-talk) session in accordance with an embodiment of the invention.

Reference is now made to FIG. 2 in which a schematic architecture of a communication system KS is shown. The communication system KS of FIG. 2 is similar to the communication system KS of FIG. 1, with only two communication groups of participants being connected to the PTT server PTT-S. The functionality of the PTT server PTT-S as well as of the Group Management Server GM-S corresponds to the components that have already been shown in FIG. 1.

As already mentioned there are two communication groups in the communication system KS in accordance with FIG. 2, with a relevant communication session KSI1 (for the first group) and KSI2 (for the second group) being able to be established between the relevant participants of a communication group. The first communication group KG1 is composed in this case of participants O, R11, and R12 whereas the second communication group KG2 is composed of the participants O, R21, R22 and R23. This means that the participant O or his mobile telephone or mobile radio device is in both the first and also the second communication group. In accordance with the prior art the participant O would thus have had to switch regularly back and forth between a session KSI1 with the first communication group and the session KSI2 with a second communication group, which in practice would mean a constant setting up and clearing down of the participation in the relevant sessions of the first and second communication group (setting up and clearing down a means, as already explained at the start of this document, a significant signaling overhead).

In accordance with the embodiment however, this is to be realized more simply and with less procedural effort in order to make it possible for participant O to participate in an uncomplicated way in communication sessions taking place in parallel.

The communication session KSI1 of the first communication group (referred to below as the first communication session) starts with the participants O, R11 and R12 such that the participant O is the inviting participant and R11, R12 the participants to be invited to the first session. A communication session can in this case be initiated or performed in accordance with the "Session Initiation Protocol" (SIP). The subject of the communication session is of no significance for the embodiment. The participant O initiates the session while the participants R11 and R12 "listen in". As already mentioned above the PTT server PTT-S regulates the sequence of the session, i.e. it organizes which of the two participants may speak when (when he has submitted a corresponding request or a wish to speak). The communication in a communication session is conducted by means of acoustic or spoken language which means that the participant O speaks into his mobile telephone or mobile radio device after he has pressed the PTT key arranged on his telephone for the purpose, and the participants R11 and R12 listen. To explain in more detail, the spoken language of the participant O is captured by a microphone in his device and sent in the form of data packets with the speech information to the PTT server which forwards or routes the data packets with the speech information to the relevant participants R11 and R12.

As already mentioned participant O is a member of both the first communication Group KG1 and also of the second communication group KG2 and can thus participate in the first (KSI1) and also in the second (KSI2) communication session. However in accordance with the embodiment, a prioritization of the relevant possible communication sessions is to be undertaken by participant O. In this case participant O signals to the PTT server PTT-S within the framework of a session prioritization message (which can be a "SIP Info" message or a "SIP Notify" message if the SIP protocol is used), that the existing first PTT session (which participant O has just started) is seen as the "active" session of participant O (cf. also FIGS. 5 and 6 in this connection). This means that this first session is the most important session for the participant O for the case in which another invitation arrives to a second PTT session which is taking place at the same time or in parallel to the first session. "Active" here means that all actions of the participant O of a speech nature, meaning that the participant O sends or receives data or data packets with speech information or spoken expressions are also passed on to the participants R11, R12 as spoken outputs. The "active" arrangement of the session is, as already mentioned, signaled to the PTT server by means of the SIP Info message and is stored on the server. This arrangement of the session or session prioritization of participant O is then forwarded by the PTT server to the participants R11 and R12 in order to also pass on to these participants R11 and R12 the participation status in the communication session of O. Further, in accordance with this embodiment, a presence list is created by the PTT server which specifies the relevant participation statuses in the communication session of the individual participants of a communication group. For example a participation state of "live" can be specified here which indicates that the corresponding participant is participating by means of voice communication in the current communication session, whereas a participation state of "prevented" or "mailbox" specifies that this participant of the communication group it is not currently participating for voice communication in the communication session or finally the participation state "delayed" specifies that this participant of the communication group will only be entering the communication session later. As can be seen later from FIGS. 3 and 4, these relevant participation statuses can be illustrated by means of specific symbols.

It should be mentioned that not only can the participant O be in a number of communication groups and participate in a number of communication sessions in parallel but also the remaining members of the first communication group, namely the participants R11 and R12, can do so. Accordingly the participants can also undertake a session prioritization and notify the PTT server. This means that the participants R11 and R12 can also notify their "active" state, for example if the SIP protocol is used, by means of the Info SIP message to the PTT server and thus signal to all participants involved in the first communication session for example if the participants expect to also receive invitations to sessions of other communication groups After the first communication session of the first communication group is now established a second communication session of the second above-mentioned communication group should be established. For example the establishment of the second communication session can be started by the participant R22 so that the second communication session takes place at the same time as the first communication session. Participants of this second communication session are participant R22 as the inviter and participants R21, R23 and O as those being invited. In this case the state now arises that the participant O is to participate simultaneously in two independent PTT sessions. The invitation of the R22 participant to the second communication session is submitted to the participant O by the PTT server PTT-S. The PTT server PTT-S now notices the "conflict", that participant O Is now to participate in parallel in two communication sessions and administers the two communication sessions in accordance with the above-mentioned session prioritization which the participant O has sent to it This means that the first communication session is to be the active communication session while the second communication session is to be treated as the passive communication session. As already mentioned the indication of an active communication session is that there is voice communication between the relevant session participants. In order to now distinguish for a "multiple" participant such as the participant O which messages originate from an active and which from a passive communication session, it is defined in accordance with this embodiment that messages from a passive communication session are to be transferred merely in text form to the participant O. This means that the PTT server PTT-S which is administering both currently active communication sessions subjects all spoken outputs, i.e. all data packets with speech information of the second communication session KSI2, which are to be distributed to the participant O, to a speech-to-text conversion so that the participant O is delivered data packets with text information from the passive communication session. The PTT server PTT-S has, as already mentioned, in accordance with the session prioritization of participant O, already set the session as "passive" for this participant, which the PTT server PTT-S then signals to all remaining participants R21, R22 and R23 of the second communication session KSI2, for example by means of a special symbol in a presence a list of the participants of the second communication session which is transferred in these participants (cf. FIG. 3).

Under another embodiment, the directing or routing of data packets is shown below, illustrating whether the data packets originate from an active or passive communication session. The participant O participates in two communication sessions, namely in one which is active (KSI1) and passive (KSI2), where data packets from the individual communication sessions are to be specially identified by the PTT server so that the mobile telephone or mobile radio device (or a specific application on it, known as the PTT client) of the participant O can assign the data packets to the correct communication sessions or PTT sessions. The PTT server that knows the participation state of each participant in a communication center (especially after it has been notified by a session prioritization message from the relevant participants, for example using the SIP elements "Info", "Notify" or "Request", as to the communication session in which a specific participant would like to participate actively or passively), identifies the relevant data packets to the participants specially in each case. By means of the identification it is then possible for the participants or applications on their mobile terminals to sort the received data packets and assign them to the corresponding communication sessions—with participation in a number of communication sessions. This will now be explained in more detail below.

As above, a first communication session KSI1 of the first communication group KG1 begins with the participants O, R11, R12, with the first communication session being initiated by the participant O. The first communication session runs, as already explained, like an entirely normal PTT session, with participant O speaking and participants R11, R12 listening to him, since PTT communication operates in half-duplex mode. Next, a second communication session KSI2 of the second communication group KG2 is initiated by participant R22, with participants R21, R23 being invited and also again participant O. The invited participants of the second communication session—also participant O—accept the invitation of participant R22, in which case after corresponding session prioritization of participant O the participation state in the second communication session of participant O is set to "passive". The result of this is that, now in accordance with the embodiment all voice messages or data packets with speech information which are routed in the direction of participant O are identified as to the communication session to which they belong, i.e. either to the first communication session or to the second communication session. In this example the identification is only necessary for the data packets to participant O since only this participant is participating in two communication sessions and had signaled a session prioritization ("active"/"passive" signaling) to the PTT-server PTT-S.

The identified data packets having speech information are now assigned by the application (PTT client) to the mobile terminal of the participant O of the relevant communication session. As already mentioned, speech information is output from an active session (here the first communication session) acoustically via a loudspeaker while the speech information of a passive session (here the second communication session) is first converted into text information which can finally be output on a display of the mobile terminal of the participant O as text. In each case it is thus possible for participant O to participate in parallel in two communication sessions, where speech information of the active session is received acoustically in the form of speech while information of the passive communication session can be followed via text display. It should be mentioned that instead of speech-to-text conversion in the mobile terminal of the participant O, it is also possible is for this type of conversion to also have been already undertaken directly by the PTT-server PTT-S, so that in addition to identifying the relevant data packets to the participant O only speech information is already contained in the data packets of the active session, whereas only text information is contained in the data packets of the passive session, which means that the computing effort in the mobile terminals, especially that of participant O, is minimized.

The identification of the data packets as to the communication sessions from which they originate or whether these are data packets with speech information or text information can in this case be provided in a header field of the relevant data packet. In this case in accordance with this embodiment of the invention an "a" for active or a "p" for passive can be used, which is then also binary coded, for example "0" for active and "1" for passive. A corresponding header field must naturally be provided in a data packet for this purpose or a corresponding bit position defined to make it possible for the PTT client on the mobile terminal to undertake an evaluation of this bit position.

In accordance with another exemplary embodiment, an above-mentioned communication session is undertaken using the SIP protocol and RTP (Real Time Protocol). RTP is used for the transmission of the actual time-critical speech data packets and also of text data packets which are time dependent. The SIP protocol is then used for communication between the participants of the communication session to establish a communication session and maintain it. In other words, this means that SIP is involved with the signaling flow which is necessary to transmit speech data or data packets with voice messages in real time to the communication session. This means, for example, that SIP signals may take over the signaling of which participants are actively and/or passively participating in which communication sessions. The RTP protocol transmits the data packets with voice messages from the speaking participant of each communication session to the relevant other participant or even possibly the data packets with text messages (which were previously converted by the PTT server) to (multiple) participants who are "passively" following this communication session. In this case the data packets are identified as already described (e.g. "0" for active and "1" for passive) at the RTP level.

Figure 3:
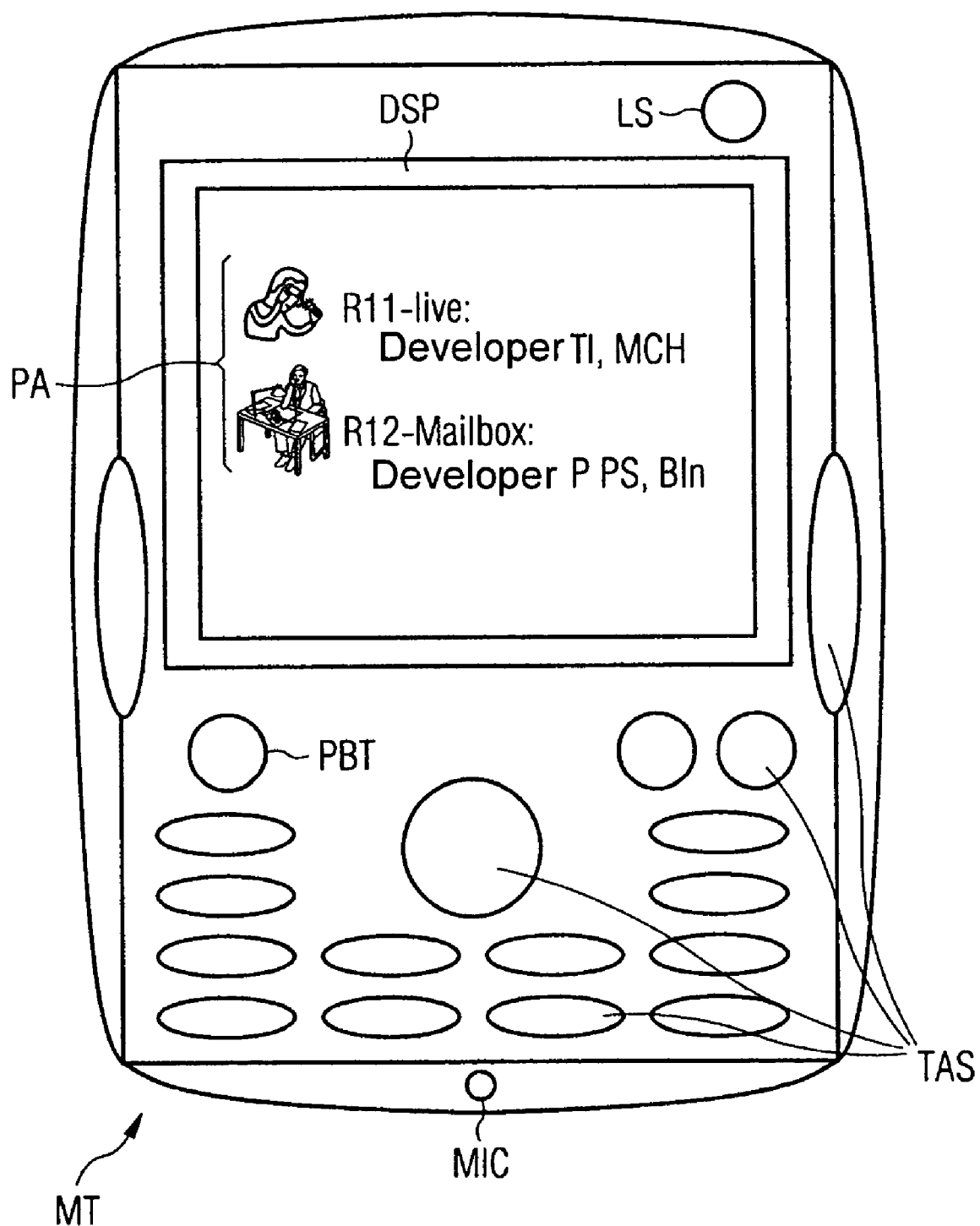
FIG. 3 is a schematic diagram of a mobile telephone that is designed to participate in a PTT session in accordance with the embodiment of the invention.

Reference is now made to FIG. 3 which shows a schematic diagram of a mobile terminal in the form of a mobile telephone of a participant in a PTT session. In this exemplary embodiment the mobile telephone of the participant O is shown in a state after the latter has initiated a first communication session with his first communication group, consisting of the participants R11, R12 and O, as has been explained for FIG. 2.

The mobile telephone MT in this case features a loudspeaker LS, a display for showing characters and pictures DSP, different keys or controls TAS, a specific PTT button PBT and a microphone MIC. Thus it is possible for example for the participant O by means of the keys TAS and a special menu appearing on the display DSP (not shown here) to initiate the first communication session with the participants of the first communication group, at which point in a special presence area PA of the display DSP a presence list of the participants in the communication group with their participation states in each case is shown. As can be seen in FIG. 3 it is indicated here that participant R11 is participating "live" in the communication session, that is he can receive voice messages for example from participant O and can possibly answer them, whereas participant R12 is not currently actively participating in the communication session but is merely involved via his "mailbox". In addition to the participation state of the relevant participant, their position in a plant or their location can be specified. If for example the participant O wishes to transfer messages to these other participants of the communication session, he can press the PTT button PBT so that this speech request is transferred to the PTT server PTT-S (cf. FIG. 2) and this server gives participant O the right to speak. Now the speech spoken by the participant O is recorded by the microphone MIC, digitized in the mobile telephone MT and transferred in the form of data packets with a speech information to the PTT server which then forwards the data packets to the other session participants. If the participant O receives a voice message in the form of data packets with speech information from other session participants, the voice messages can be output via a loudspeaker LS.

Figure 4:
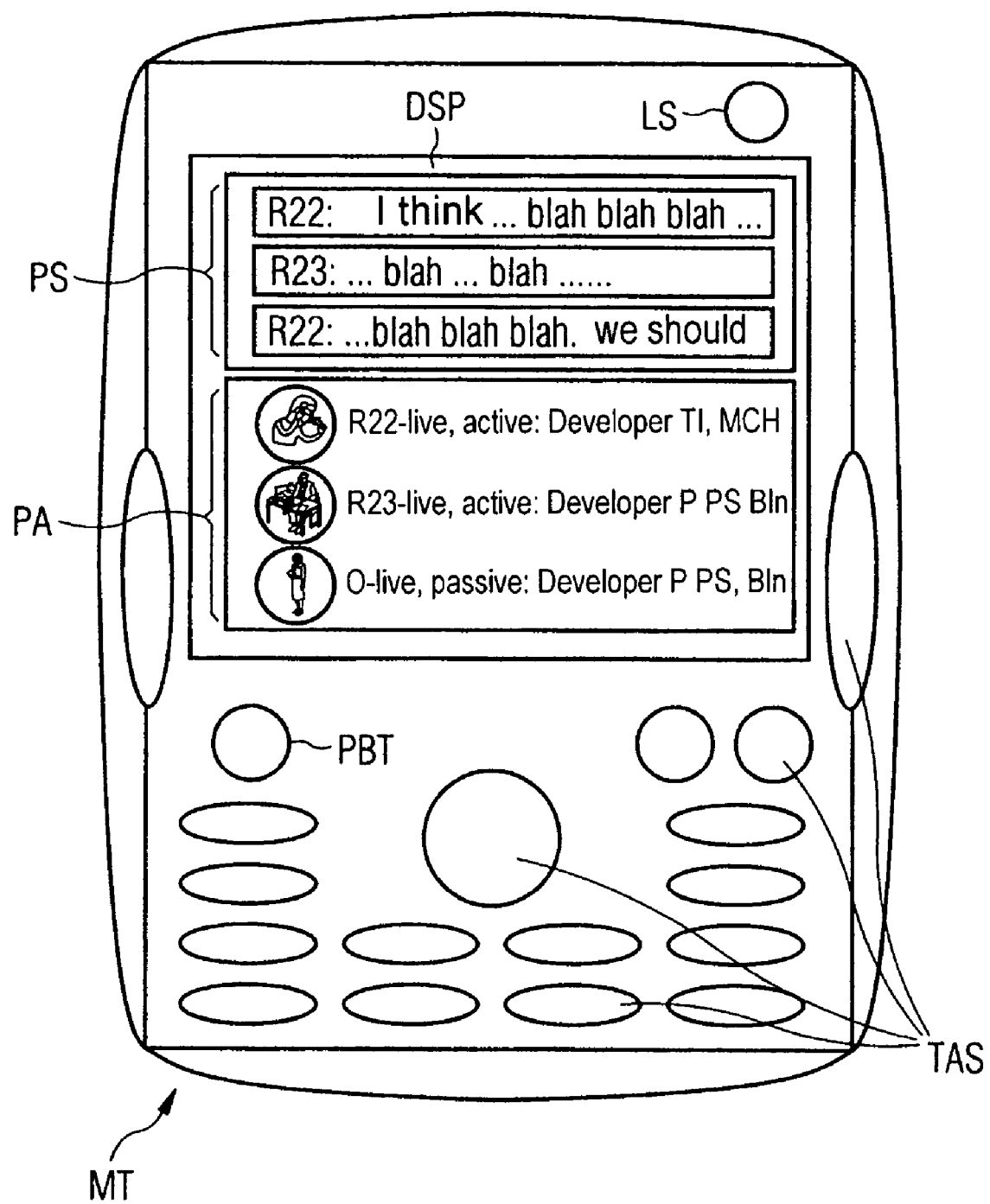
FIG. 4 is a further schematic diagram of the mobile telephone from FIG. 3, for output of information from both an "active" and also from a "passive" communication session.

Reference will now be made to FIG. 4 in which a mobile telephone MT of a participant (again participant O here) is shown in a communication session with the same structure as explained in FIG. 3. In contrast with FIG. 3, the display DSP of the mobile telephone MT now features an additional area PS as well as the presence area PA for presentation of information from the passive communication session. In this case it is possible to show in the presence area PA, the participants in an active communication session (as is shown in FIG. 3) and also show the participants of a passive communication session. One of the keys TAS can be used to switch between the views. In the example of FIG. 4, the participants of the passive communication session as seen by participant O, namely participants of the second communication group R22, R23 and O are now listed in the presence area PA with whom, as has been explained in FIG. 2, the participant O is conducting a passive communication session in accordance within his session prioritization. The voice messages of these communication participants are output via the display DSP into the area PS. In this case it is possible, to improve their visibility in the area PA, to provide the symbols representing the participants with further symbols or colors in order to better to visualize their participation status in a communication session. For example, as is shown in the Figure, a colored circle can be drawn around specific participants of which the color indicates whether a participant is taking part actively or passively in the communication session.

In order for participant O to follow the information which is being exchanged in the communication group which he has identified as passive, the relevant messages of the communication group (here the second communication group KSI2) are shown in the area PS of the display DSP. As can be seen here the individual messages of the participants R22 and R23 are each shown in dashed boxes, so that the participant O can assign these messages to the individual participants R22 and R23. As already explained these text messages can have already been converted by the PTT server into this text form and can have been sent to the participant O in text form.

Figure 5:
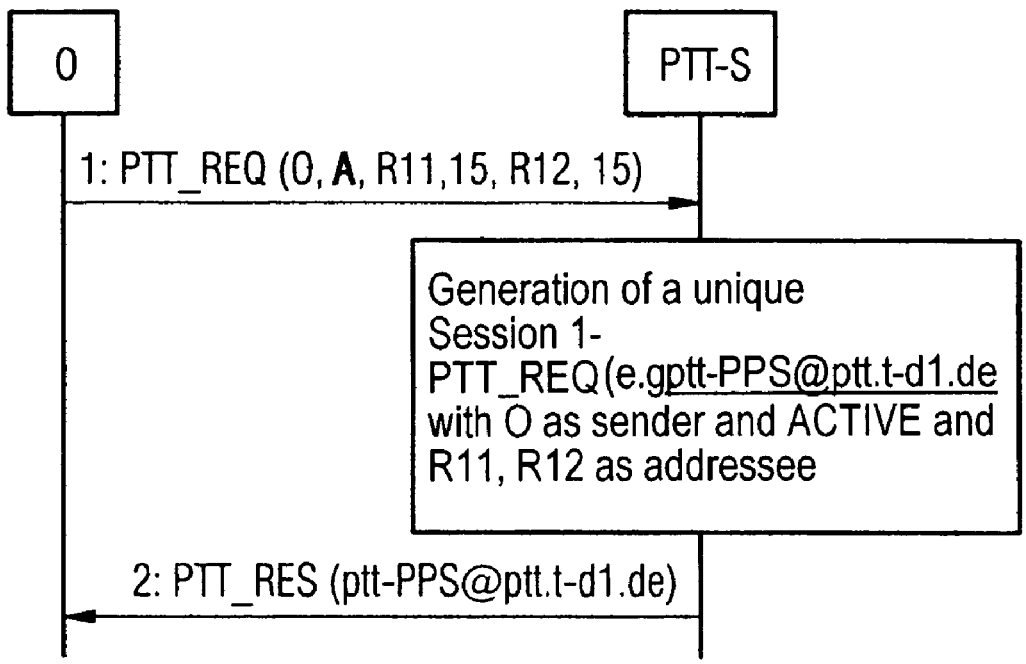
FIG. 5 is a signaling sequence for transfer of the session prioritization in an SIP request element or an SIP request message.

Reference is now made to FIG. 5 in which a typical signaling sequence for notification of a defined session prioritization is shown. Using the case explained in FIG. 2 as its starting point, the participant O belonging to the first communication group (consisting of the participants O, R11 and R12) has defined that the first communication session KSI1 just initiated by him based on the first communication group is to be seen as a "active". As already explained for FIG. 2 a communication session or PTT session can be conducted in accordance with the SIP protocol. This means that it is then possible for the participant O to notify the PTT server PTT-S by means of an SIP request message "PTT_REQ (O, A, R11, 15, R12, 15)" for the first communication session (session 1) with the first communication group that he desires an active participation state for this communication session The PTT server receives this request of participant O and stores it during the communication session. As has been further explained in relation to FIG. 2, this session prioritization of participant O can also be notified to the other participants R11 and R12, for example that in the corresponding entry of participant O in a presence list on the displays (cf. the area PA in FIGS. 3 and 4) of the other participants in each case a mark is provided. Subsequently the PTT server PTT-S sends a confirmation of the request of the participant O in the form of the message "PTT_RES (ptt-PPS@ptt.t-d1.DE)".

Naturally the participant O can classify the first communication session as "passive" in which case he can again send an SIP request message to the PTT server, except that here the letter "A" in the above-mentioned message is to be replaced for example by the letter "P".

Figure 6:
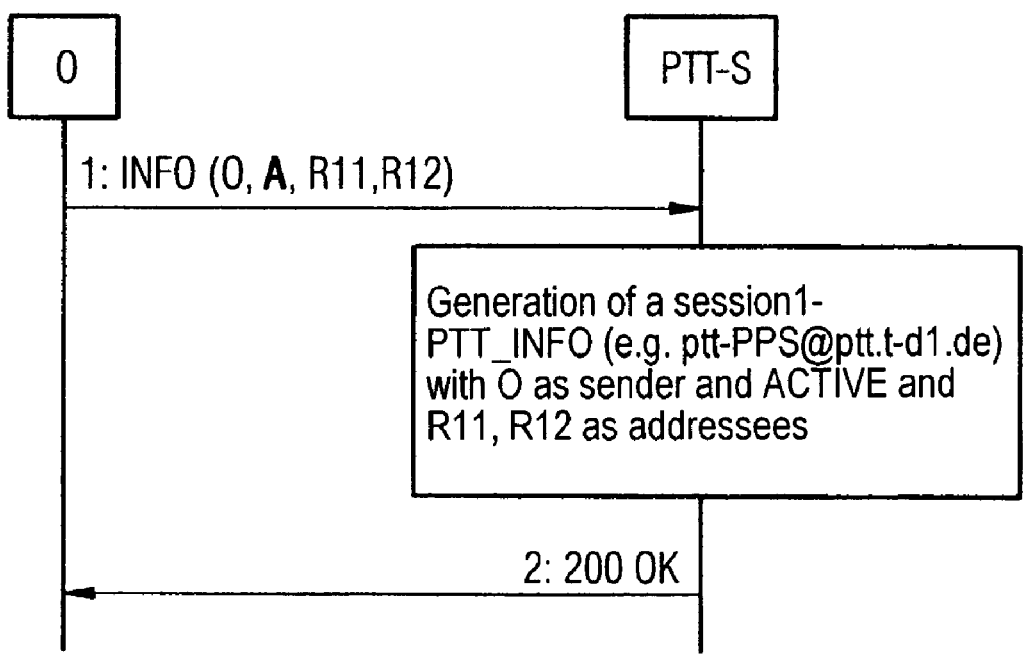
FIG. 6 is a signaling sequence for transfer of the session prioritization in an SIP info element or an SIP NFO message.

It is also possible for the participant O to transmit his session prioritization to the PTT server by means of a SIP Info message, which in accordance with FIG. 6 for example has the form "INFO (O, A, R11, R12)". Accordingly the PTT server returns a confirmation message "200 OK" to participant O. By replacing the letter "A" for example by a letter "P", participant O can also announce that he would only like to participate "passively" in the current communication session.

Figure 7:
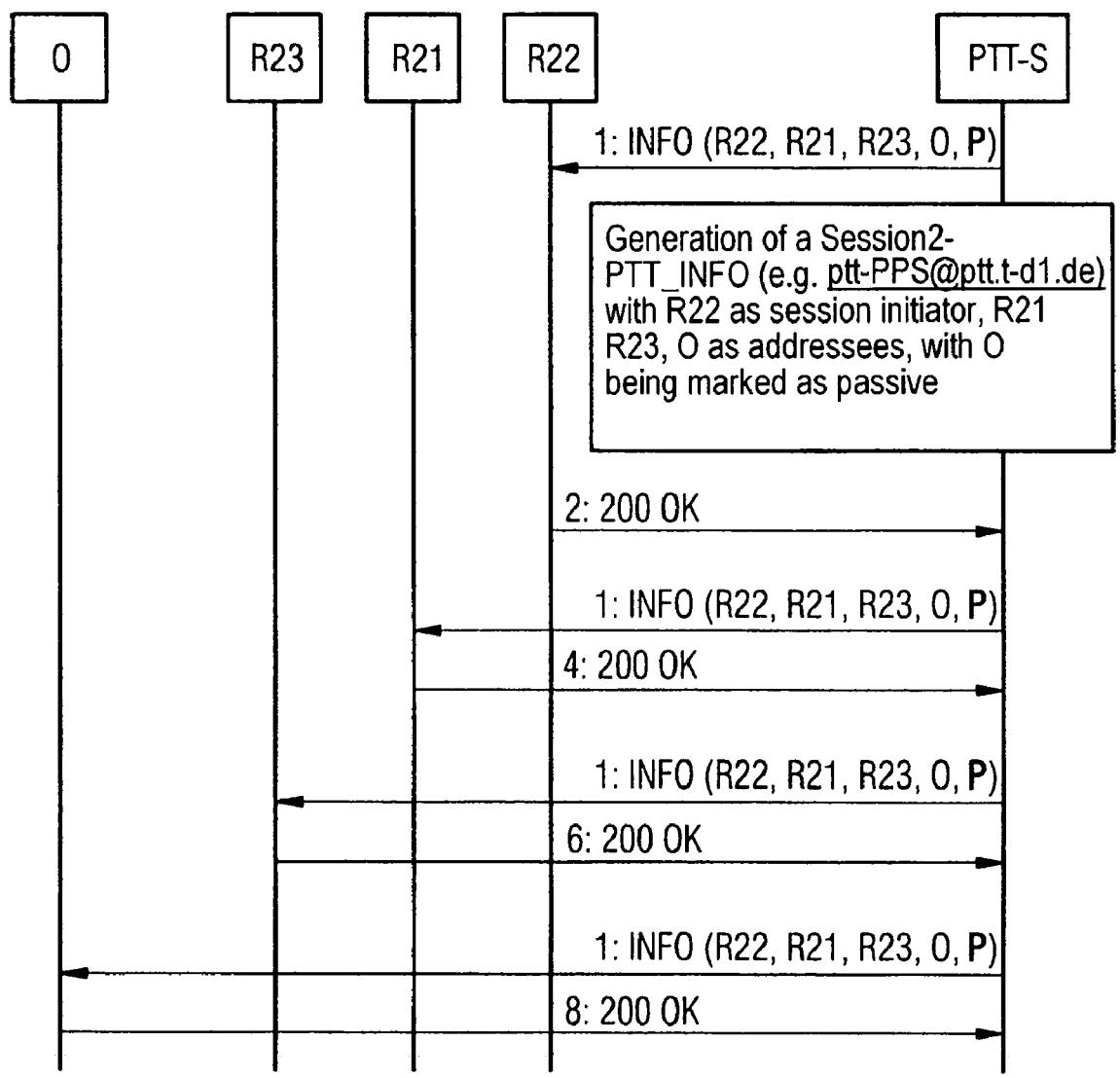
FIG. 7 is a signaling sequence for transfer of the session prioritization to mark a passive participation state in an SIP info element.

Reference is now made to FIG. 7 in which a typical signaling sequence is shown by means of which the second communication session KSI2 shown in FIG. 2 initiated by participant R22 (Session Initiator), consisting of the participants R21, R22, R23 and O is to be notified that the participant O in a second communication session KSI2, based on the second communication group is to be classified as passive or would like to be in the passive participation state here. As can be seen in the Figure, an SIP info-message "Info (R22, R21, R23, O, P)" goes to every participant of the second communication session starting from the PTT server PTT-S to express that the participant O wishes to have a passive ("P") participation state for the second communication session with the second communication group. The relevant participants confirm receipt of this Info message with a message "200 OK".

As already stated above with regard to FIG. 2 or 7 for example, all participants of the current communication sessions or PTT sessions taking place can be informed about participants who are participating in a number of communication sessions KSI1, KSI2 and thus it is known from them that in accordance with the above example the participant O is from now on following a number of communication sessions and possible reactions or reaction times (in the first or the second communication session) are to be calculated in.

With the implementation shown above of communication sessions taking place in parallel the following problem can arise. Between the communication sessions no flow of information takes place for the participants who are not participating in parallel in a number of communication sessions to inform them about the status or activity status of the participants who are acting in parallel in a number of communication sessions. So for example the participants of the second communication session KSI2 (the passive communication session for the participant O) will not be informed according to the above implementation whether the participant O is currently active in the first communication session KSI1 (the active communication session for him), i.e. is speaking or has the right to speak and is actively influencing the discussion there. The participants of the second communication session (in the above example R21, R22, R23 as well as O) will thus in accordance with their communication session continue to see the participant O as a passive participant but believe that he is "listening in" to the discussion or is accessible (on a text basis) in the second communication session or second communication group. If however the participant O is currently speaking in the first communication session, because he is concentrating on this, he finds it hard to follow the second communication session (on a text basis). Since the participant O cannot react in such a situation to events in the second communication session KSI2, the participants of the second communication session may have to repeat inquiries to participant O or even end the communication session to the participant O since they must assume that O is no longer interested. The participant O in his turn cannot reply or react since he is in action/speaking in the first communication session KSI1. It would also be against the conventional implementation of communication sessions or. PTT sessions to briefly interrupt the first communication session KSI1 while the participant O is in the act of speaking in order to inform the second communication session KSI2 or its participants about this state or activity state of the participant O.

This problem will now be resolved in accordance with the following embodiment by means of expanded signaling. The action of participant O in the first communication session, i.e. he is currently speaking in the discussion (with his PTT button PBT pressed) can be utilized by the PTT server PTT-S and signaled to the (other) participants of the second communication session (R21, R22, R23). This means the situation in which participant O must press the PTT button to request an authorization from PTT server PTT-S in order to be active in the first communication session can be exploited and the fact that O is active or is speaking can be signaled for successful speaking authorization for the first communication session KSI1 to the second communication session KSI2, to notify the (other) participants of the second communication session that the participant O is currently speaking (cf. also FIGS. 8 and 9) and for example cannot actually react to requests in the second communication session. This signaling can advantageously then be implemented for the participants or their mobile stations in the presence list in the presence area PA (cf. FIG. 11) as flashing or striking through of the symbol relating to participant O. For example the "passive" symbol of participant O in the second communication session can then flash in the presence list of the participants of the second communication session. This signals to these participants that the participant O is currently in action in his active communication session, the first communication session (is contributing to the discussion by speaking) and therefore cannot supply requests or comments to the second communication session at the moment, but that he can respond after a delay once the active status is ended. The ending of the action is notified to the PTT server PTT-S by the participant O by releasing the PTT button PBT (cf. also FIG. 10) and thereby also the participants of the second communication session, in that the "passive" symbol in the presence list no longer flashes.

The setting up of two parallel communication sessions with expanded signaling between the communication sessions as has just been described will further be explained in detail below. The starting point is a basic communication system KS, as shown in FIG. 2.

A first communication session KSI1 begins with the participants O, R11 and R12, with the communication session being initiated by participant O. The first communication session KSI1 runs like an entirely conventional PTT session, in which the participant O for example is speaking and the participants R11 and R12 are listening, since this is based on half-duplex operation. Now a second communication session KSI2 is initiated by participant R22 and participants R21, R23 and also O are invited to it. The invited participants of the second communication session, also O, accept the invitation, with the participation state of the participant O being set by the PTT server PTT-S to "passive" since O has already declared the first communication session as "active" (cf. also the explanation for FIG. 2 above). The result of this is that with immediate effect all data packets are identified by the PTT server (means RTP) in the direction of participant O as to the communication session to which they belong, to communication session KSI1 or KSI2. The identification is for example only necessary for the participant O since only he is simultaneously participating in two communication sessions and had signaled a session prioritization ("active"/"passive" signaling) to the PTT server.

The identified data packets are now assigned by an application (PTT client) on the mobile station of participant O to the relevant communication session. O then sees on the display DSP of his mobile station the PTT outputs for the second communication session as text (the voice messages from the second communication session are, as explained above, advantageously converted by the PTT server into text and then sent to O as text data packets) and hears the PTT outputs for the first communication session as voice outputs through the loudspeaker LS or earpiece of his mobile station (and all this simultaneously). In accordance with the identification of the PTT server the PTT client sorts the data packets of the relevant output to the relevant communication session. The identification of the speech or text packets is again undertaken in the header field of each packet, in which case an "a" for active or "p" for passive or a corresponding binary coding can be used.

The participant O had in the example up to this point not merely followed the two communication sessions actively, namely the communication session KSI1 as active session by means of an earpiece and the communication session KSI2 as a passive session by means of text messages in the display (cf. also for example FIG. 4). Now the participant O is requested by the participant R12 of the first communication session KSI1 to explain a process which is to be discussed between the participants R11, R12 and O. The participant O thus presses the PTT button PBT and begins to make the requested explanation for the process to R11 and R12. When the PTT button PBT is pressed, a signal is sent to the PTT server PTT-S (O requests the right to speak from the PTT server and is given it since no other participant, i.e. neither R11 nor R12 wishes to speak), that participant O is currently active or busy in the first communication session. This signaling (cf. also the FIG. 8 or 9 in this context), that is the issuing of the right to speak to O is however now also forwarded to the second communication session or to its participants, in order to signal to participants R21, R22, R23 that the participant O cannot react at the moment to the opinions and requirements of the second communication session since he is currently supplying the first communication session with information. The signal in the relevant presence list of the participants of the second communication session can be a flashing or a strike-through (cross) of the symbol with regard to participant O (cf. also FIG. 11 in this context), which already signals the passive status in the second communication session (Session2). The flashing or striking through of the symbol of participant O notifies the participants of the second communication session KSI2 that participant O is participating passively in their communication session but is currently active in the first communication session (Session1) or is busy in this session, and any actions or requests to participant O will be delayed until participant O has ended his activities in the first communication session by releasing the PTT button PBT (cf. FIG. 10 in this context). Although participant O then still has an active participation state in the first and a passive participation state in the second communication session, he now has no active or busy activity state in the first communication session any longer so that he can now follow the second communication session better again (on a text basis) that when he was in action in the first communication session.

Figure 8:
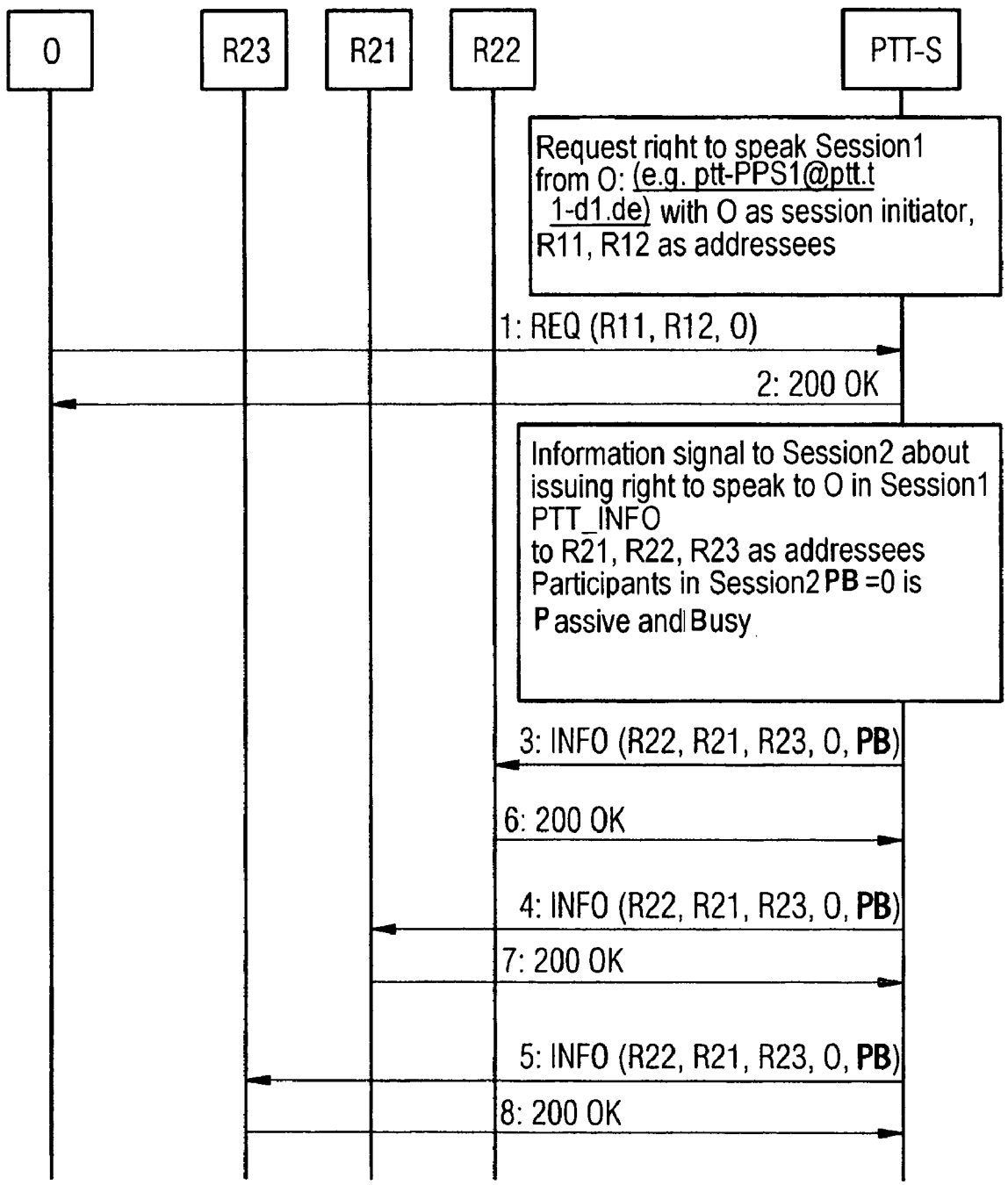
FIG. 8 is a signaling sequence to transfer the activity status "active" or "busy" of a multiple participant to the participants of a communication session prioritized by the former as passive.
Figure 9:
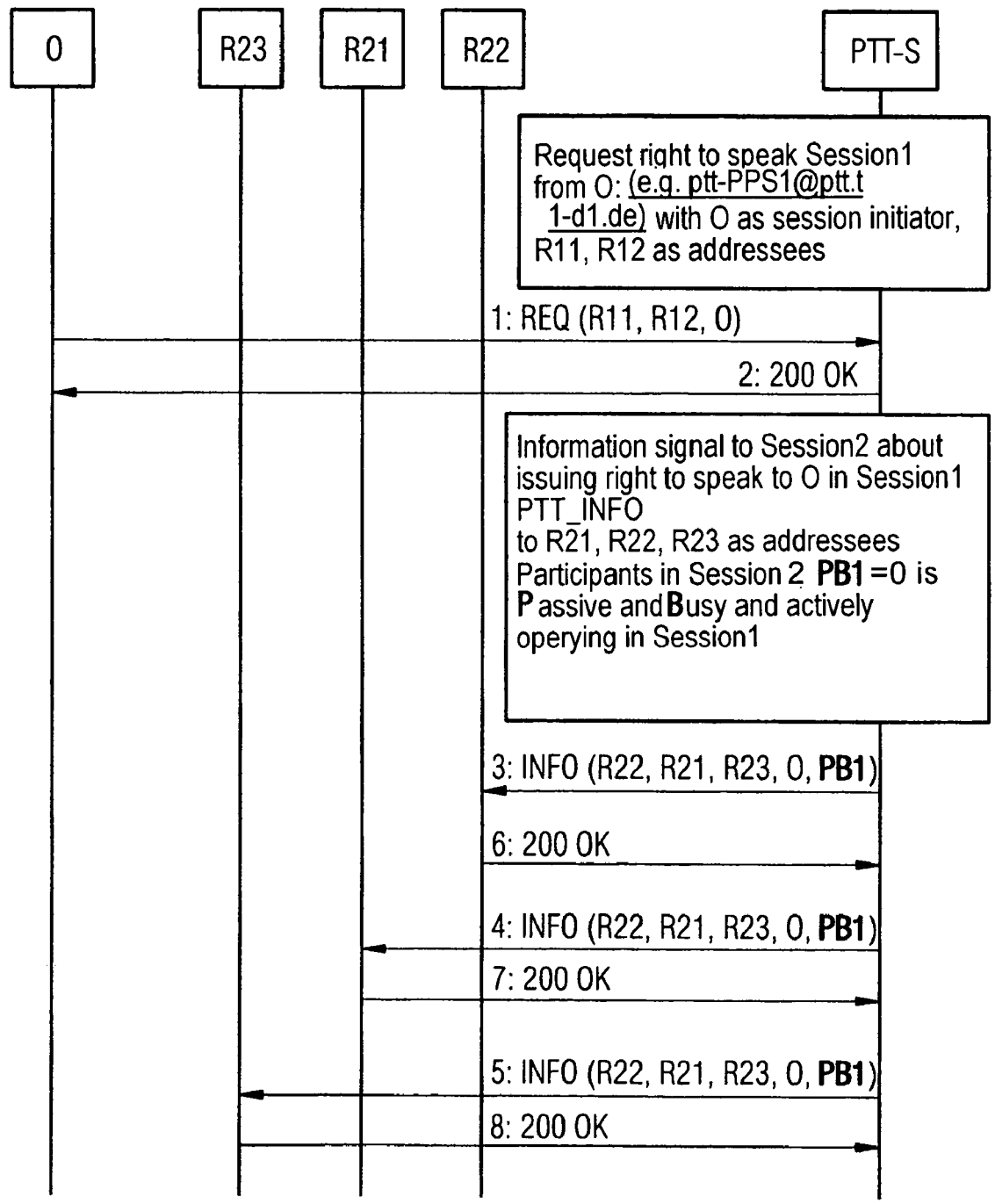
FIG. 9 is a transformation of the signaling sequence of FIG. 8.

Reference will now be made to FIG. 8 in which a typical signaling sequence is shown, by means of which the second communication group KG2 of second communication session KSI2 comprising participants R21, R22, R23 and O shown in FIG. 2 are to be notified in accordance with the above-mentioned expanded signaling between the communication sessions that participant O is currently in action or is busy in a communication session (Session1) prioritized as active by him as regards the participation status. As can be seen from the Figure, participant O sends (especially initiated by pressing the PTT button PBT on his mobile telephone) a request REQ(R11,R12,O) to request the right to speak to the PTT server PTT-S, whereupon an SIP Info-message "Info (R22, R21, R23, O, PB)" is sent to each active participant of the second communication session (Session2) from the PTT server PTT-S to indicate that participant O is passive in the second communication session and is busy "PB2") in the first communication session or has the right to speak in this session. The relevant participants confirm receipt of this Info message with a message "200 OK". Instead of the SIP Info message a corresponding SIP Notify message can be used for signaling.

For the case in which a participant, such as participant O, is participating in a number of communication sessions, it is also conceivable that in an SIP Info message or SIP Notify message there can be a concrete specification of the communication session in which the "multiple" participant is participating. Thus in a signaling sequence in FIG. 9 similar to that of FIG. 8, instead of the parameter "PB" a parameter "PB21" can specify that participant O is currently specifically busy in the first communication session.

Figure 10:
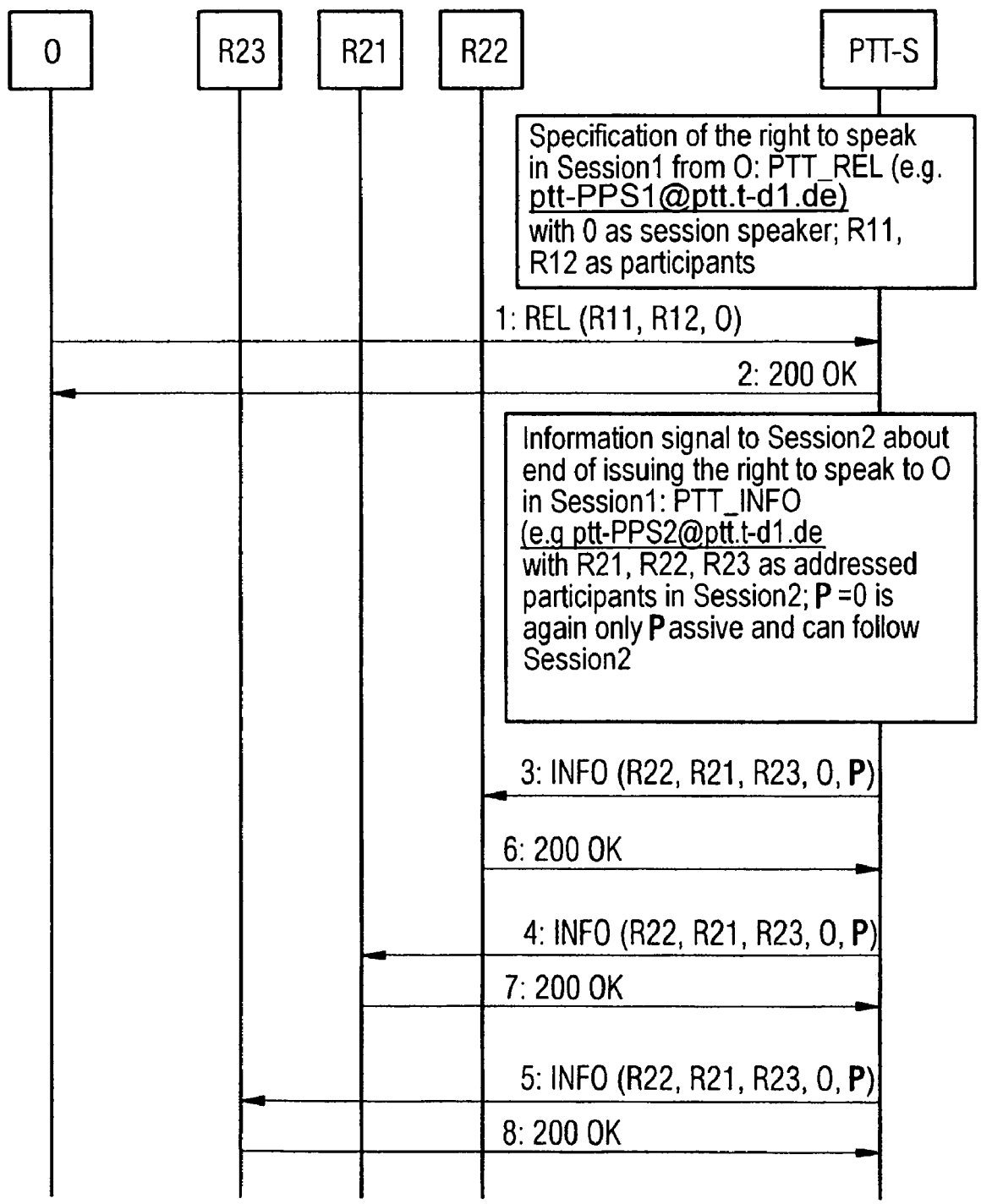
FIG. 10 is a signaling sequence to transfer the activity status "passive" of a multiple participant to the participants of a communication session prioritized by the former as passive.

Reference will now be made to FIG. 10 in which a typical signaling sequence is shown, by means of which the second communication group KG2 of second communication session KSI2 consisting of the participants R21, R22, R23 and O shown in FIG. 2 is to be notified in accordance with the above-mentioned expanded signaling between the communication sessions that participant O is no longer in action or is busy in a communication session prioritized as active by him as regards the participation status. As can be seen from the Figure, participant O sends (especially initiated by releasing the PTT button PBT on his mobile telephone) a release REL(R11,R12,O) to relinquish the right to speak to the PTT server PTT-S, whereupon an SIP Info-message "Info (R23, R23, R23, O, PB)" is sent to each active participant of the second communication session from the PTT server PTT-S to indicate that participant O is passive in the second communication session and is no longer busy ("P") in the first communication session and as a consequence can listen in again (on a text basis) to the second communication session. The relevant participants confirm receipt of this Info message, with a message "200 OK". Instead of the SIP Info message a corresponding SIP Notify message can be used for signaling.

Figure 11:
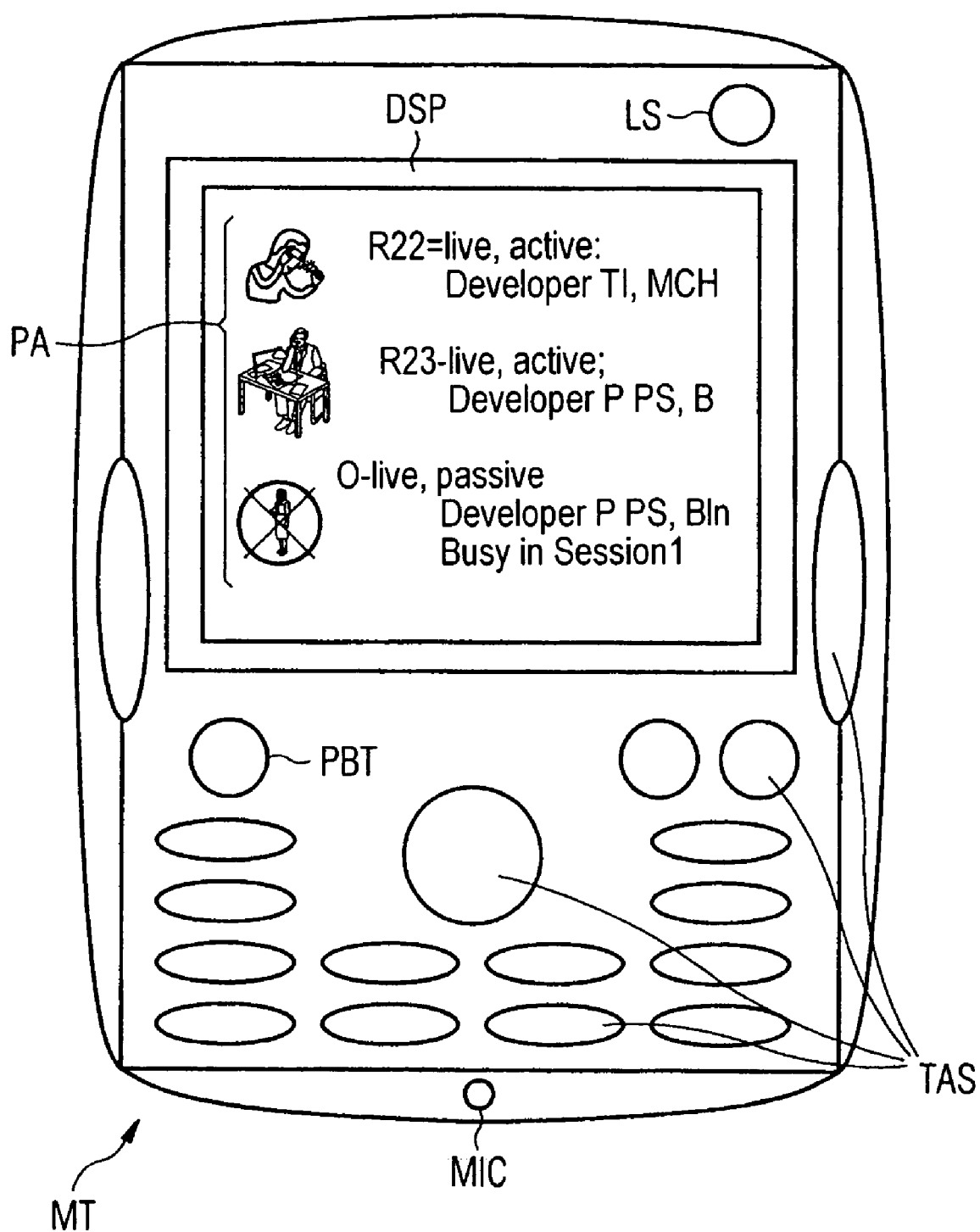
FIG. 11 is a schematic diagram of a mobile telephone that is designed for participation in a PTT session with expanded signaling between communication sessions, for example in accordance with FIGS. 8 to 10.

Reference is now made to FIG. 11 in which a schematic diagram of a mobile terminal in the form of a mobile telephone MT of a participant in a PTT session is shown. In this case for example the mobile telephone MT of participant R21 is shown, to put it more precisely in a state after the latter has initiated a second communication session with his second communication group, consisting of the participants R21, R22, R23 and O, as has been explained for FIG. 2 in connection with the expanded signaling between the communication sessions.

The mobile telephone MT is set up again in this case like the mobile telephone shown in FIG. 3 or 4, and the reader is referred to these Figures for a detailed explanation of the components. It is thus possible for example for participant R21 by means of the keys TAS and a special menu appearing in the display DSP (not shown here) to initiate the second communication session with the participants of the second communication group, whereupon in a special presence area PA of the display DSP a presence list of the participants of the communication group with their relevant participation states and in this embodiment of the activity status of participants who are simultaneously participating in a number of communication sessions are listed. As is indicated in FIG. 11, all three participants R22, R23 and O are "live" in the communication session and can for example receive messages of participant R21 and possibly respond to these. The circle around participant O indicates the he is only participating passively in the second communication session since he has just prioritized another (first) communication session as his active communication session. The cross or the strike-through for participant O in the Figure further indicates that this participant is currently in action or busy in his active communication session, (as for example has been notified in a signaling sequence shown in FIGS. 8 and 9 to the other participants of the second communication session). Instead of the cross, the symbol for participant O can be made to flash to indicate an "active" or "busy activity status. If participant O were to end his action in his active communication session, the cross through his symbol would disappear.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for administration of communication sessions in a packet-oriented communication system, comprising a central control device and a plurality of mobile stations, that are connected to each other via the central control device, the method comprising the steps of:

setting up a first communication session between mobile stations, that are assigned to a first communication group, via the central control device;

defining a session prioritization for a first mobile station of the first communication group which is further assigned to at least one second communication group, wherein the session prioritization specifies the communication session with one of the assigned communication groups, the first mobile station communicating in an active participation state, and wherein the communication session the other participants of the assigned communication group in which the first mobile station communicating in a passive participation state transmitting the session prioritization to the central control device;

setting up a second communication session between a further mobile stations wherein the second communication session includes a mobile station from the first communication session, and wherein the second communication session is assigned to the at least one second communication group, via the central control device and administering the first mobile station through the central control device in the two communication sessions in accordance with the transmitted session prioritization.

2. The method according to claim 1, wherein, in which, in the active participation state of a communication session, data packets with speech information are transmitted to or from the first mobile station.

3. The method according to claim 1, wherein in the active participation state the speech information is acoustically output and/or captured by the relevant mobile station.

4. The method according to claim 3, wherein the speech information and the text information are output simultaneously.

5. The method according to claim 1, wherein the passive participation state, data packets with text information are transmitted to the first mobile station.

6. The method according to claim 5, wherein the text information is output on a display of the first mobile station.

7. The method according to claim 1, wherein the mobile stations of the first communication group or of the at least one second communication group are informed of the relevant participation state of the first mobile station in the communication group by the central control device.

8. The method according to claim 1, wherein the other mobile stations of the relevant communication group are informed by the central control device as to the communication session with the communication group in which the first mobile station is participating at the moment.

9. The method according to claim 1, wherein data packets with speech information from a communication session in which the first mobile station is participating in the passive participation state are converted by the central control device (PTT-S) into data packets with text information and sent to the first mobile station (O).

10. The method according to claim 1, wherein data packets that are transmitted from the central control device to the first mobile station, are identified as to whether they originate from a communication session in which the first mobile station is actively or passively participating.

11. The method according to claim 10, wherein the first mobile station analyzes the identification of the data packets, and for the information contained in them in each case, performs a speech output or text output.

12. The method according to claim 1, wherein, in a communication session of a communication group, only one mobile station has the right at a specific time to transmit data packets as a sender with speech information, whereas the other mobile stations of the communication group, as recipients, may not interrupt.

13. The method according to claim 1, wherein after transmission of data packets with speech information from a sending mobile station in a communication session of a communication group to the central control device, the other mobile stations are informed by the central control device that data packets are ready for transmission, whereupon those mobile stations which would like to receive the data packets from the central control device notify the central control device so that the central control device transmits the data packets to these mobile stations.

14. The method according to claim 1, wherein the mobile stations of a communication session in which the first mobile station is participating in a passive participation state, are sent an activity status of the first mobile station in the communication session wherein the first mobile station is participating in an active participation state.

15. The method according to claim 14, wherein the activity status specifies whether the first mobile station in the communication session with active participation state currently has the right to speak or not.

16. The method according to claim 14, wherein the mobile stations of a communication session in which the first mobile station is participating in a passive participation state are shown the activity status of the first mobile station (O) on a display of the relevant mobile stations.

17. A system for administration of communication sessions in a packet-oriented communication system, comprising:

a central control device;

a plurality of mobile stations, connected to each other via the central control device;

means for setting up a first communication session between mobile stations, that are assigned to a first communication group, via the central control device;

means for defining a session prioritization for a first mobile station of the first communication group which is further assigned to at least one second communication group, wherein the session prioritization specifies the communication session with one of the assigned communication groups, the first mobile station communicating in an active participation state, and wherein the communication session the other participants of the assigned communication group in which the first mobile station communicating in a passive participation state means for transmitting the session prioritization to the central control device;

means for setting up a second communication session between a further mobile stations wherein the second communication session includes a mobile station from the first communication session, and wherein the second communication session is assigned to the at least one second communication group, via the central control device; and means for administering the first mobile station through the central control device in the two communication sessions in accordance with the transmitted session prioritization.

* * * * *